United States Patent
Nakai

(10) Patent No.: US 6,236,512 B1
(45) Date of Patent: May 22, 2001

(54) COLLIMATOR LENS AND LIGHT-SCANNING APPARATUS USING THE SAME

(75) Inventor: Yoko Nakai, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/335,529

(22) Filed: Jun. 18, 1999

(30) Foreign Application Priority Data

Jul. 9, 1998 (JP) .................................................. 10-193827

(51) Int. Cl.$^7$ .................................................. G02B 27/30
(52) U.S. Cl. .......................... 359/641; 359/717; 359/795
(58) Field of Search .................................. 359/196–226, 359/641, 708, 717, 795

(56) References Cited

U.S. PATENT DOCUMENTS

| | | | | |
|---|---|---|---|---|
| 5,216,550 | * | 6/1993 | Rudeen ................................. | 359/196 |
| 5,491,587 | * | 2/1996 | Iwaki et al. ........................... | 350/641 |
| 5,550,668 | * | 8/1996 | Appel et al. .......................... | 359/204 |

FOREIGN PATENT DOCUMENTS

| | | |
|---|---|---|
| 58-14109 | 1/1983 | (JP) . |
| 58-38915 | 3/1983 | (JP) . |
| 61-273520 | 12/1986 | (JP) . |
| 61-279820 | 12/1986 | (JP) . |
| 63-226085 | 3/1990 | (JP) . |

* cited by examiner

Primary Examiner—James Phan
(74) Attorney, Agent, or Firm—Snider & Associates; Ronald R. Snider

(57) ABSTRACT

For securing necessary brightness and back focus and favorably correcting off-axis aberrations while in a simple lens configuration, a collimator lens comprises, successively from the parallel luminous flux side, a first lens $L_1$ made of a negative meniscus lens having a convex surface directed onto the light source side, and a second lens $L_2$ made of a biconvex lens having a surface with a greater curvature directed onto the parallel luminous flux side. The surface of the second lens $L_2$ on the parallel luminous flux side is formed as an aspheric surface. The collimator lens satisfies the following conditional expression (1):

$$-0.87 < R_1/f < -0.38 \qquad (1)$$

where $R_1$ is the paraxial radius of curvature of the surface of the first lens $L_1$ on the parallel luminous flux side; and $f$ is the focal length of the whole lens system.

7 Claims, 7 Drawing Sheets

NA 0.25

-0.2    0.2
SPHERICAL ABERRATION($\mu$m)

$\omega = 1.91°$

—— SAGITTAL
---- TANGENTIAL

-0.2    0.2
ASTIGMATISM($\mu$m)

0.002$\lambda$

WAVEFRONT ABERRATION($\omega = 0°$)

0.002$\lambda$

WAVEFRONT ABERRATION($\omega = 1.43°$)

0.002$\lambda$

WAVEFRONT ABERRATION($\omega = 1.43°$)

0.002$\lambda$

WAVEFRONT ABERRATION($\omega = 1.91°$)

0.002$\lambda$

WAVEFRONT ABERRATION($\omega = 1.91°$)

NA 0.25

SPHERICAL ABERRATION($\mu$m)

$\omega = 1.91°$

—— SAGITTAL
---- TANGENTIAL

ASTIGMATISM($\mu$m)

0.002$\lambda$

WAVEFRONT ABERRATION($\omega = 0°$)

0.002$\lambda$

WAVEFRONT ABERRATION($\omega = 1.43°$)

0.002$\lambda$

WAVEFRONT ABERRATION($\omega = 1.43°$)

0.002$\lambda$

WAVEFRONT ABERRATION($\omega = 1.91°$)

0.002$\lambda$

WAVEFRONT ABERRATION($\omega = 1.91°$)

NA 0.30

-0.2  0.2
SPHERICAL ABERRATION(μm)

ω=1.91°

— SAGITTAL
---- TANGENTIAL

-0.2  0.2
ASTIGMATISM(μm)

0.002λ

WAVEFRONT ABERRATION(ω=0°)

0.002λ

WAVEFRONT ABERRATION(ω=1.43°)

0.002λ

WAVEFRONT ABERRATION(ω=1.43°)

0.002λ

WAVEFRONT ABERRATION(ω=1.91°)

0.002λ

WAVEFRONT ABERRATION(ω=1.91°)

ated Patent

COLLIMATOR LENS AND LIGHT-SCANNING APPARATUS USING THE SAME

RELATED APPLICATIONS

This application claims the priority of Japanese Patent Application No. 10-193827 filed on Jul. 9, 1998, which is incorporated herein by reference.

BACKGROUND OF THE INVENTION

1. Field of the Invention

The present invention relates to a collimator lens usable in a light-scanning apparatus such as copier, laser printer, or the like which scans a laser beam in order to record or display an image; and, in particular, to a collimator lens for converting a divergent luminous flux emitted from a light source such as semiconductor laser into a parallel luminous flux, and a light-scanning apparatus using the same.

2. Description of the Prior Art

Various kinds of light-scanning apparatus such as copier, laser printer, and the like for scanning a laser beam in order to record or display an image have conventionally been known.

Such a light-scanning apparatus is configured such that a laser beam emitted from a semiconductor laser is converted by a collimator lens into a parallel luminous flux, which is then deflected in response to the rotation of a rotary polygon mirror, and thus deflected luminous flux is focused by an fθ lens onto an imaging surface.

Here, as the collimator lens, those of a two-group/two-element configuration have been known as disclosed, for example, in Japanese Unexamined Patent Publication Nos. 58-14109, 58-38915, 61-279820, 61-273520, and 2-73324, so as to reduce the weight and dimensions of lens.

In general, it is necessary for the collimator used in such a light-scanning apparatus to be a bright lens system in order to enhance the efficiency of utilization of the light from the light source and increase the illuminance on the photosensitive drum surface. As a consequence, the collimator lens would have a numerical aperture greater than that of fθ lens systems in general, whereby aberrations generated thereby are likely to increase. Therefore, in the collimator lens, it is necessary to favorably correct these aberrations such as wavefront aberration.

Meanwhile, as the light-scanning apparatus, there has been known a multibeam system which uses a plurality of light sources so as to carry out multibeam scanning, thereby achieving a higher scanning speed and enabling a plurality of different information items to be recorded at the same time in a single scanning operation. In the case where this multibeam system is employed or the like, it is desirable that aberrations be favorably corrected within the range of about 2 degrees in terms of half angle of view ω.

In the collimator lenses disclosed in the above-mentioned publications, most of examples have a narrow angle of view, for instance, such that their performances with respect to off-axis light are taken into consideration only for an angle of view on the order of installation errors. Aberrations are so large in examples with a large angle of view that it is difficult for the collimator lenses to be employed in a multibeam scanning optical system having a plurality of light sources disposed on a plane perpendicular to the optical axis, for example.

Further, in the collimator lenses disclosed in the above-mentioned publications, back focus, i.e., the distance from the lens on the light source side to the light source, is short, i.e., about 0.4f to 0.6f.

If the back focus is short, however, then the collimator lens is disposed near the light source (semiconductor laser or the like), whereby the temperature of the collimator lens is likely to increase due to the heat from the light source. Therefore, it is desired that the distance from the collimator lens to the light source be made greater in order for the collimator lens to be less susceptible to the heat from the light source.

SUMMARY OF THE INVENTION

In view of the above-mentioned circumstances, it is an object of the present invention to provide a collimator lens which, while in a simple lens configuration of two groups and two elements, can favorably correct off-axis aberrations to about 2 degrees in terms of half angle of view ω and secure necessary back focus; and a light-scanning apparatus using the same.

The collimator lens in accordance with the present invention comprises, successively from a parallel luminous flux side, a first lens having a negative refracting power and a second lens having a positive refracting power, wherein at least one surface of the second lens is formed as an aspheric surface.

Preferably, the surface of the second lens on a light source side is formed as a convex surface.

Preferably, the surface of the first lens on the parallel luminous flux side is formed as a concave surface.

Further, the collimator lens is preferably configured so as to satisfy the following conditional expression (1):

$$-0.87 < R_1/f < -0.38 \tag{1}$$

where $R_1$ is the paraxial radius of curvature of the surface of the first lens on the parallel luminous flux side; and f is the focal length of the whole lens system.

The light-scanning apparatus in accordance with the present invention uses the above-mentioned collimator lens.

In the light-scanning apparatus in accordance with the present invention, four semiconductor laser light sources for red, green, blue, and monochrome may be disposed on a plane perpendicular to an optical axis of the collimator lens.

Also, in the light-scanning apparatus in accordance with the present invention, a plurality of semiconductor laser light sources for monochrome may be arranged in a sub-scanning direction of a light beam.

When the surface of the second lens on the light source side is formed as an aspheric surface, the above-mentioned "convex surface" refers to a surface in which the radius (hereinafter referred to as approximate radius of curvature) of the arc connecting three points in total consisting of a point on the optical axis of this aspheric surface and two points at end parts of the effective diameter is negative.

BRIEF DESCRIPTION OF THE DRAWINGS

FIGS. 4A, 4B, and 4C-1 to 4C-5 are aberration charts (showing spherical aberration, astigmatism, and wavefront aberration) of the collimator lens in accordance with Example 1 of the present invention;

FIGS. 5A, 5B, and 5C-1 to 5C-5 are aberration charts (showing spherical aberration, astigmatism, and wavefront aberration) of the collimator lens in accordance with Example 2 of the present invention;

FIGS. 6A, 6B, and 6C-1 to 6C-5 are aberration charts (showing spherical aberration, astigmatism, and wavefront aberration) of the collimator lens in accordance with Example 3 of the present invention;

FIGS. 7A, 7B, and 7C-1 to 7C-5 are aberration charts (showing spherical aberration, astigmatism, and wavefront aberration) of the collimator lens in accordance with Example 4 of the present-invention; and FIGS. 8A, 8B, and 8C-1 to 8C-5 are aberration charts (showing spherical aberration, astigmatism, and wavefront aberration) of the collimator lens in accordance with Example 5 of the present invention.

DESCRIPTION OF THE PREFERRED EMBODIMENTS

In the following, the collimator lens and light-scanning apparatus in accordance with embodiments of the present invention will be explained with reference to the accompanying drawings.

Figure 1:
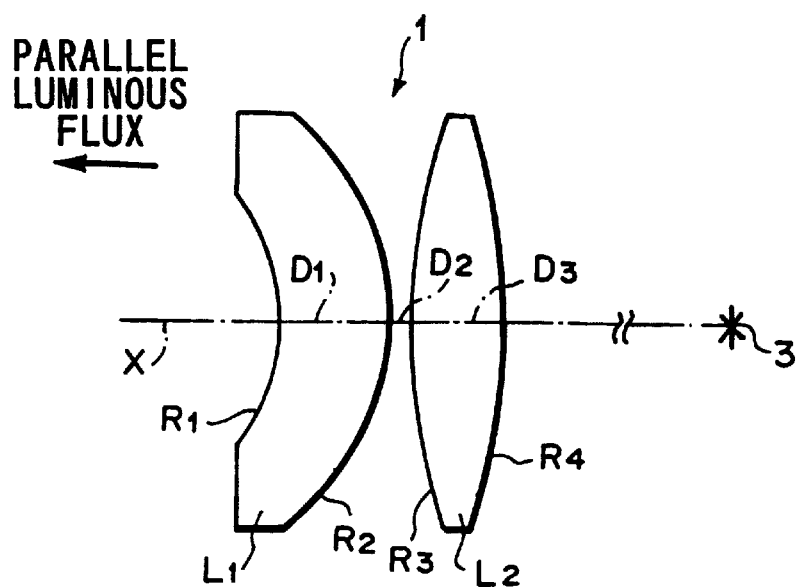
FIG. 1 is a basic lens configurational view of the collimator lens in accordance with Example 1 of the present invention.
Figure 2:
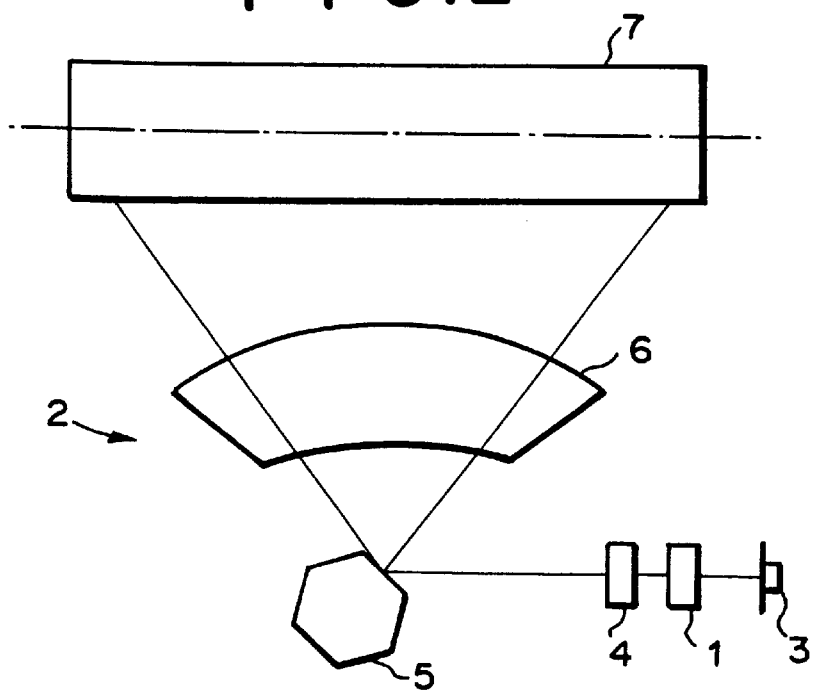
FIG. 2 is a schematic configurational view of a light-scanning apparatus using the collimator lens shown in FIG. 1.

FIG. 1 is a basic lens configurational view of the collimator lens in accordance with an embodiment of the present invention (represented by the one corresponding Example 1), whereas FIG. 2 is a schematic configurational view of a light-scanning apparatus using the collimator lens shown in FIG. 1.

The collimator lens 1 in accordance with the present invention is used in an optical system of a light-scanning apparatus 2 such as laser printer, copier, or the like for scanning a laser beam in order to record or display an image.

In the light-scanning apparatus 2, as shown in FIG. 2, the laser beam emitted from a semiconductor laser 3 is converted into a parallel luminous flux by the collimator lens 1, an auxiliary optical system 4 comprising a slit, a cylindrical lens, and the like is used for correcting the surface tilting of a polygon mirror 5, the laser beam is deflected by the polygon mirror 5, the deflected laser beam is guided onto the surface of a photoconductive photosensitive drum 7 by an fθ lens 6 so as to form a minute beam spot which is scanned on the recording medium.

As shown in FIG. 1, the collimator lens in accordance with this embodiment is a lens of a two-group/two-element configuration comprising, successively from the parallel luminous flux side, a first lens $L_1$, whose surface on the parallel luminous flux side is a concave surface, having a negative refracting power; and a second lens $L_2$, whose surface on the light source side is a convex surface, having a positive refracting power. At least one surface of the second lens $L_2$ is formed as an aspheric surface. In FIG. 1, the surface of the second lens $L_2$ on the parallel luminous flux side is formed as an aspheric surface. In FIG. 1, X indicates the optical axis.

The aspheric surface form of the second lens $L_2$ is represented by the following aspheric surface expression. This aspheric surface expression is also used for the aspheric surface forms in Examples which will be explained later.

$$f(\rho) = \frac{\frac{\rho^2}{R}}{1+\sqrt{1-k\left(\frac{\rho}{R}\right)^2}} + a_4\rho^4 + a_6\rho^6 + a_8\rho^8 + a_{10}\rho^{10}$$

where $f(\rho)$ is the length (mm) of the perpendicular to the tangential plane (the plane perpendicular to the optical axis) of an apex of the aspheric surface from a point on the aspheric surface at a height p from the optical axis;

R is the paraxial radius of curvature of the aspheric surface;

$\rho$ is the height (mm) from the optical axis;

k is the eccentricity; and $a_4$, $a_6$, $a_8$, and $a_{10}$ are the fourth, sixth, eighth, and tenth-order aspheric surface coefficients, respectively.

Also, the collimator lens 1 in accordance with this embodiment satisfies the following conditional expression (1):

$$-0.87 < R_1/f < -0.38 \qquad (1)$$

where $R_1$ is the paraxial radius of curvature of the surface of the first lens $L_1$ on the parallel luminous flux side; and f is the focal length of the whole lens system.

When the above-mentioned conditional expression (1) is satisfied, wavefront aberration can favorably be corrected. In particular, wavefront aberration in tangential direction can be corrected quite favorably.

Also, back focus can be increased when the surface of the second lens $L_2$ on the light source side is formed as a convex surface, whereas back focus can be attained more securely when the surface of the first lens $L_1$ on the parallel luminous flux side is formed as a concave surface.

Thus configured collimator lens 1, though in a simple lens configuration of two groups and two elements, can favorably correct off-axis aberrations while exhibiting a wide angle of view and securing a certain degree of numerical aperture (approximately NA=0.25 to 0.3), and can yield a favorable light-scanning apparatus using the same.

The collimator lens 1 in accordance with this embodiment can make the luminous flux on the light source side nearly telecentric. Namely, due to its favorable off-axis performances, the lens performances would not deteriorate even when the light source is not located on the optical axis or in a configuration where a plurality of light sources are disposed near the optical axis.

Using this characteristic, the collimator lens 1 of this embodiment can be used in a multibeam scanning optical system in which a plurality of semiconductor lasers, as light sources, are disposed on a plane perpendicular to the optical axis. For example, in a color copier or the like, three semiconductor laser light sources corresponding to red, green, and blue, respectively, or four semiconductor laser light sources including the one for monochrome in addition to the above-mentioned three semiconductor laser light sources can be disposed on a plane perpendicular to the optical axis. Also, when a plurality of semiconductor laser light sources for monochrome are arranged in the sub-scanning direction, the number of scanning operations can be reduced, whereby the light-scanning time can be shortened.

Also, the collimator lens 1 in accordance with this embodiment can be used as an objective lens for causing an object disposed on the parallel luminous flux side to form an image onto a recording medium and collecting and scanning the laser beam at this image-forming position, or an objective lens for optical discs.

When the collimator lens 1 of this embodiment is used in the manner mentioned above, it is desirable that the focal length of the whole lens system be 3 to 30 mm.

In the following, each of Examples 1 to 5 will be explained with specific values.

EXAMPLE 1

As shown in FIG. 1, the collimator lens 1 in accordance with Example 1 comprises, successively from the parallel luminous flux side, a first lens $L_1$ made of a negative meniscus lens having a convex surface directed onto the light source side, and a second lens $L_2$ made of a biconvex lens having a surface with a greater curvature directed onto the parallel luminous flux side, whereas the surface of the second lens $L_2$ on the parallel luminous flux side is formed as an aspheric surface.

The upper part of the following Table 1 shows the radius of curvature R of each lens surface, the center thickness of each lens and air space between neighboring lenses D, and refractive index N of each lens at a wavelength of 780 nm in Example 1. In Table 1 and Tables 2 to 5 which will be explained later, each value is normalized with the focal length of the whole lens system being taken as 1, and the numerals indicating the letters R, D, and N successively increase from the parallel luminous flux side. Also, in Table 1 and Tables 2 to 5 which will be explained later, each surface to which "*" is attached on the left side of the surface number is an aspheric surface, whereas the radius of curvature R of each aspheric surface is a value of radius of curvature near the optical axis.

The middle part of Table 1 indicates the respective values of constants K, $a_4$, $a_6$, $a_8$, and $a_{10}$ of the aspheric surface indicated by the above-mentioned aspheric surface expression in Example 1.

The lower part of Table 1 shows the values of numerical aperture NA, half angle of view ω, back focus Bf, and $R_1/f$ in conditional expression (1) in the collimator lens 1 of Example 1.

As can be seen from Table 1, conditional expression (1) is satisfied in Example 1.

EXAMPLE 2

The configuration of the collimator lens 1 in accordance with Example 2 is substantially the same as that of Example 1.

The upper part of the following Table 2 shows the radius of curvature R of each lens surface, the center thickness of each lens and air space between neighboring lenses D, and refractive index N of each lens at a wavelength of 780 nm in Example 2.

The middle part of Table 2 indicates the respective values of constants K, $a_4$, $a_6$, $a_8$, and $a_{10}$ of the aspheric surface indicated by the above-mentioned aspheric surface expression in Example 2.

The lower part of Table 2 shows the values of numerical aperture NA, half angle of view ω, back focus Bf, and $R_1/f$ in conditional expression (1) in the collimator lens 1 of Example 2.

As can be seen from Table 2, conditional expression (1) is satisfied in Example 2.

EXAMPLE 3

Figure 3:
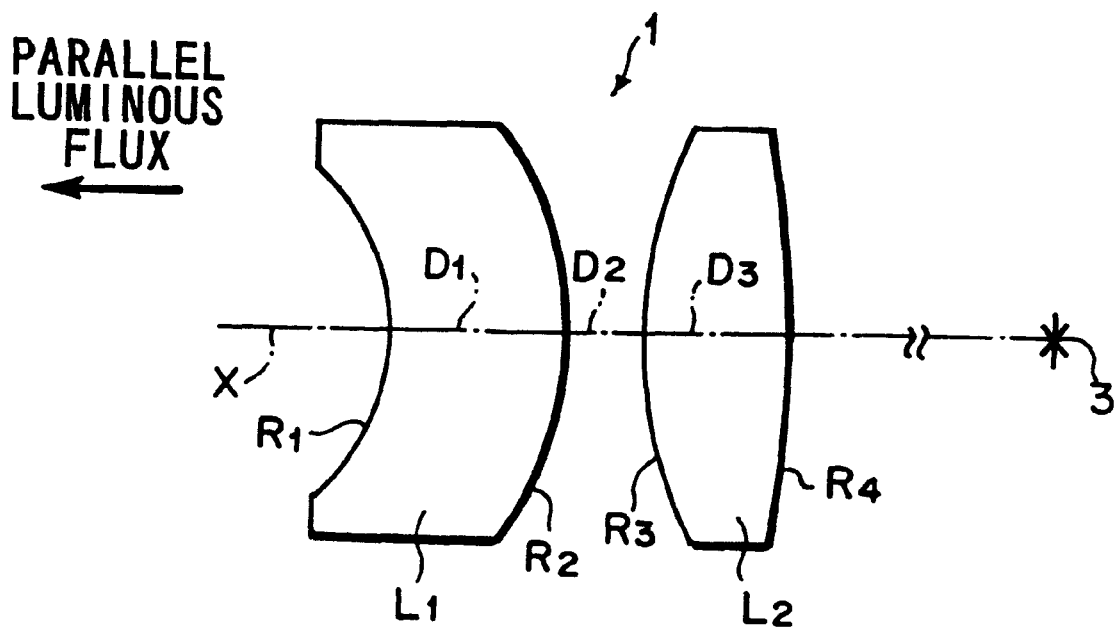
FIG. 3 is a basic lens configurational view of the collimator lens in accordance with Example 3 of the present invention.

As shown in FIG. 3, the configuration of the collimator lens 1 in accordance with Example 3 is substantially the same as that of Example 2 except that both surfaces of the second lens $L_2$ are formed as aspheric surfaces.

The upper part of the following Table 3 shows the radius of curvature R of each lens surface, the center thickness of each lens and air space between neighboring lenses D, and refractive index N of each lens at a wavelength of 780 nm in Example 3.

The middle part of Table 3 indicates the respective values of constants K, $a_4$, $a_6$, $a_8$, and $a_{10}$ of the aspheric surfaces indicated by the above-mentioned aspheric surface expression in Example 3.

The lower part of Table 3 shows the values of numerical aperture NA, half angle of view ω, back focus Bf, effective diameter $\phi_4$ of the surface of the second lens $L_2$ on the light source side, approximate radius of curvature $r_4$ of the surface of the second lens $L_2$ on the light source side, and $R_1/f$ in conditional expression (1) in the collimator lens 1 of Example 3.

As can be seen from Table 3, conditional expression (1) is satisfied in Example 3.

EXAMPLE 4

The configuration of the collimator lens 1 in accordance with Example 4 has a configuration substantially the same as that of Example 1 except that the surface of the second lens $L_2$ on the light source side is formed as an aspheric surface.

The upper part of the following Table 4 shows the radius of curvature R of each lens surface, the center thickness of each lens and air space between neighboring lenses D, and refractive index N of each lens at a wavelength of 780 nm in Example 4.

The middle part of Table 4 indicates the respective values of constants K, $a_4$, $a_6$, $a_8$, and $a_{10}$ of the aspheric surface indicated by the above-mentioned aspheric surface expression in Example 4.

The lower part of Table 4 shows the values of numerical aperture NA, half angle of view ω, back focus Bf, effective diameter $\phi_4$ of the surface of the second lens $L_2$ on the light source side, approximate radius of curvature $r_4$ of the surface of the second lens $L_2$ on the light source side, and $R_1/f$ in conditional expression (1) in the collimator lens 1 of Example 4.

As can be seen from Table 4, conditional expression (1) is satisfied in Example 4.

EXAMPLE 5

The configuration of the collimator lens 1 in accordance with Example 5 has a configuration substantially the same as that of Example 3 except that the second lens $L_2$ is constituted by a biconvex lens having a surface with a greater curvature directed onto the light source side.

The upper part of the following Table 5 shows the radius of curvature R of each lens surface, the center thickness of each lens and air space between neighboring lenses D, and refractive index N of each lens at a wavelength of 780 nm in Example 5.

The middle part of Table 5 indicates the respective values of constants K, $a_4$, $a_6$, $a_8$, and $a_{10}$ of the aspheric surfaces indicated by the above-mentioned aspheric surface expression in Example 5.

The lower part of Table 5 shows the values of numerical aperture NA, half angle of view ω, back focus Bf, effective diameter $\phi_4$ of the surface of the second lens $L_2$ on the light source side, approximate radius of curvature $r_4$ of the surface of the second lens $L_2$ on the light source side, and $R_1/f$ in conditional expression (1) in the collimator lens 1 of Example 5.

As can be seen from Table 5, conditional expression (1) is satisfied in Example 5.

FIGS. 4A to 8C-5 show aberration charts (indicating spherical aberration, astigmatism, and wavefront aberration) of collimator lenses in accordance with Examples 1 to 5. The aberration charts of each Example indicate the state where a glass plate having a thickness of 0.0417 mm (refractive index: 1.51) is included on the light source side. In these aberration charts, ω indicates the half angle of view. Also, each astigmatism chart shows the respective aberrations with respect to sagittal (S) and tangential (T) image surfaces.

Figure 4A:
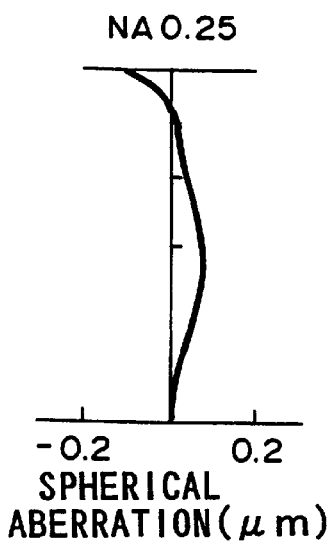
Figure 4B:
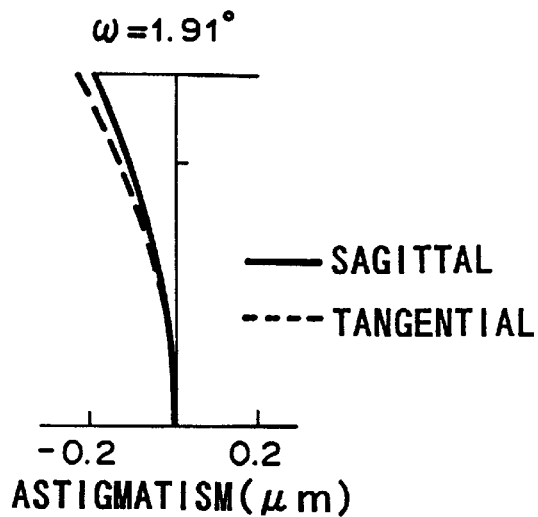
Figures 1, 4C:
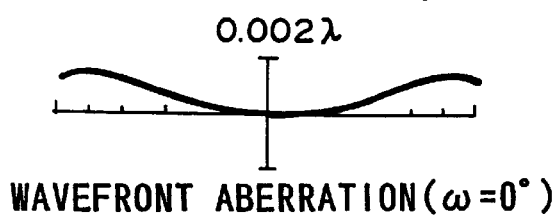
Figures 2, 4C:
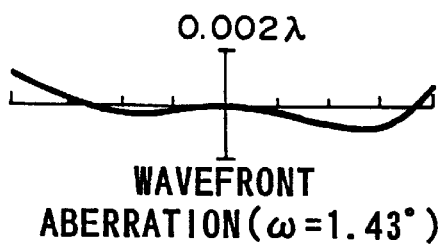
Figures 3, 4C:
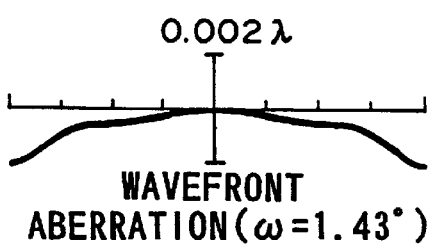
Figures 4, 4C:
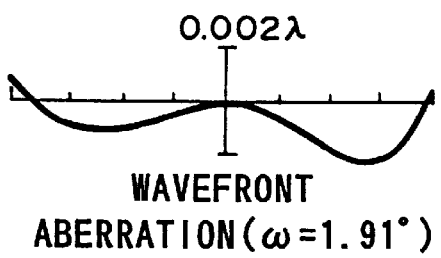
Figures 4, 4C, 5:
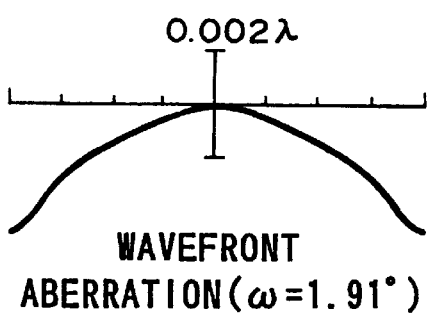
Figure 5A:
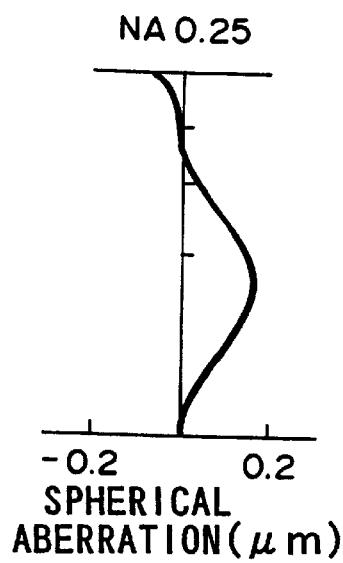
Figure 5B:
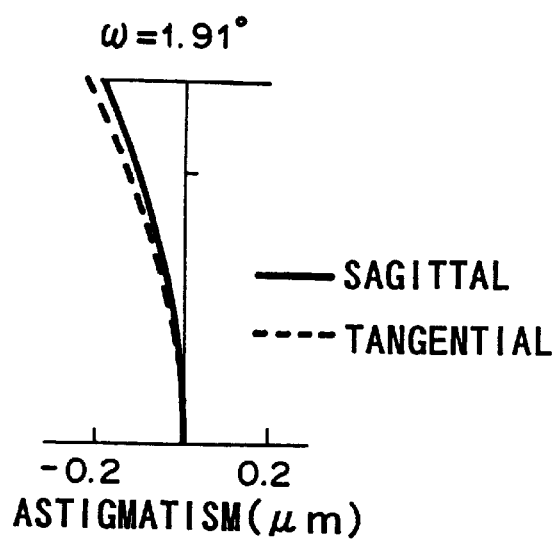
Figures 1, 5C:
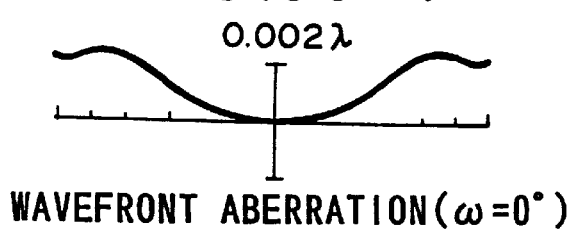
Figures 2, 5C:
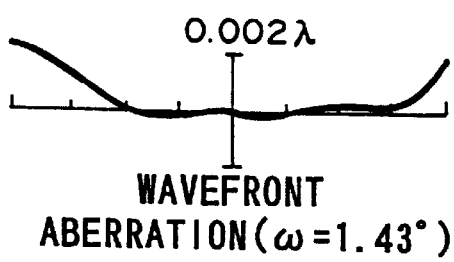
Figures 3, 5C:
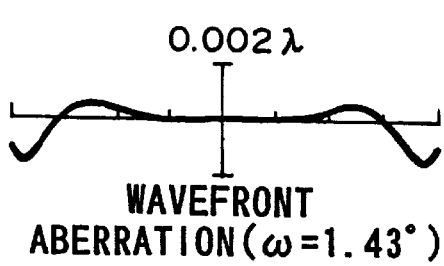
Figures 4, 5C:
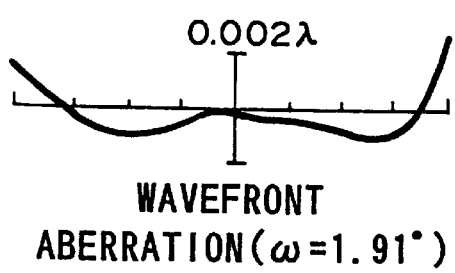
Figures 5, 5C:
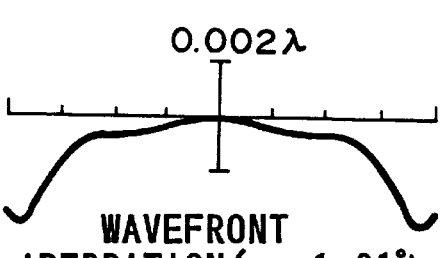
Figure 6A:
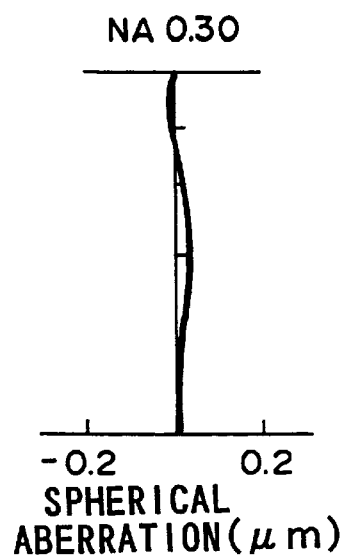
Figure 6B:
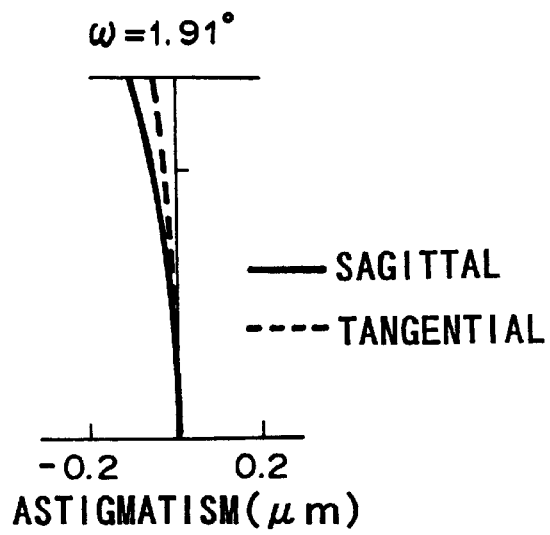
Figures 1, 6C:
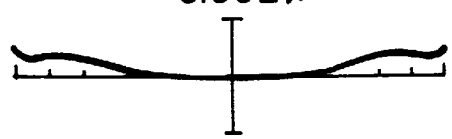
Figures 2, 6C:
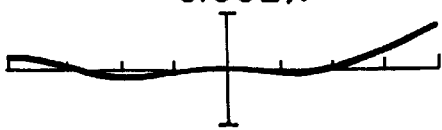
Figures 3, 6C:
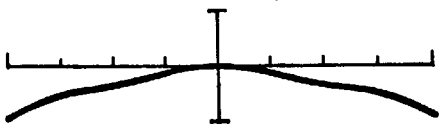
Figures 4, 6C:
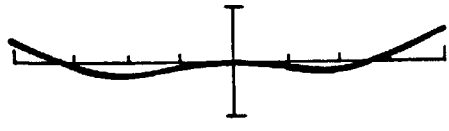
Figures 5, 6C:
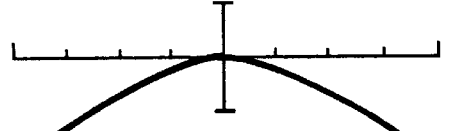
Figure 7A:
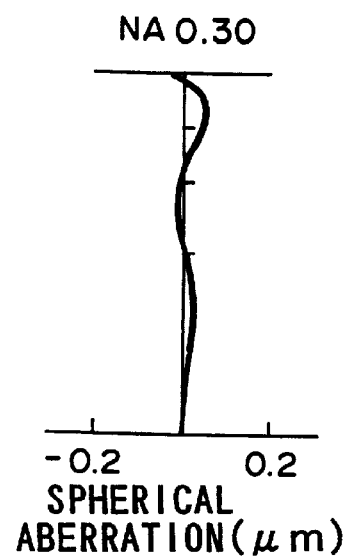
Figure 7B:
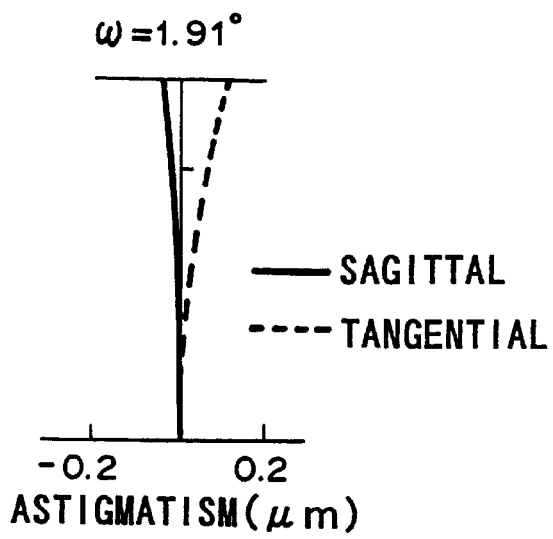
Figures 1, 7C:
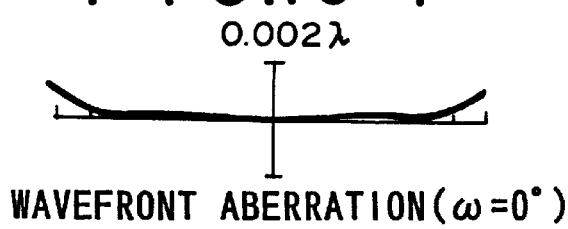
Figures 2, 7C:
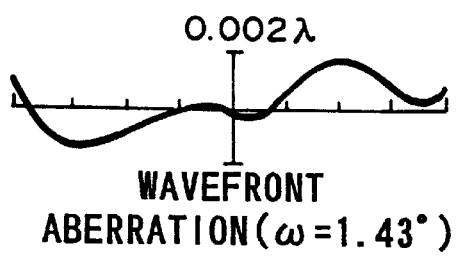
Figures 3, 7C:
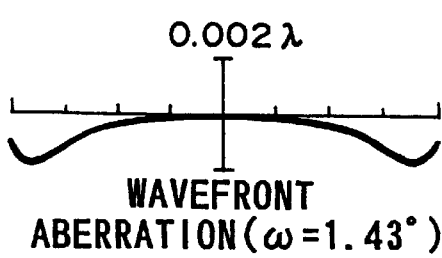
Figures 4, 7C:
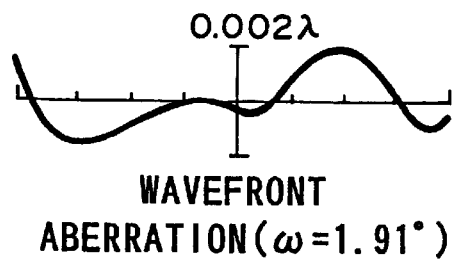
Figures 5, 7C:
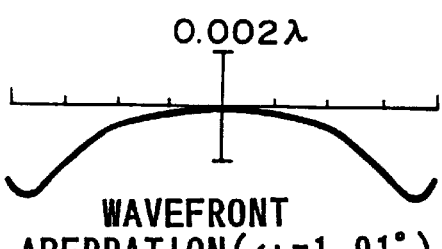
Figure 8A:
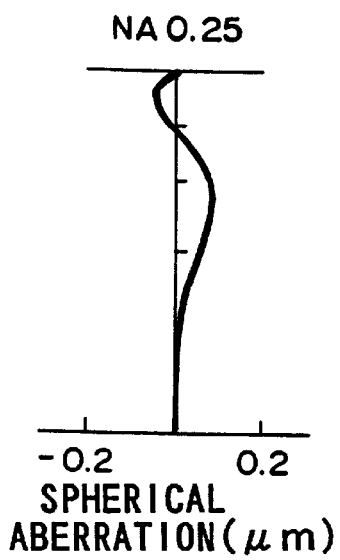
Figure 8B:
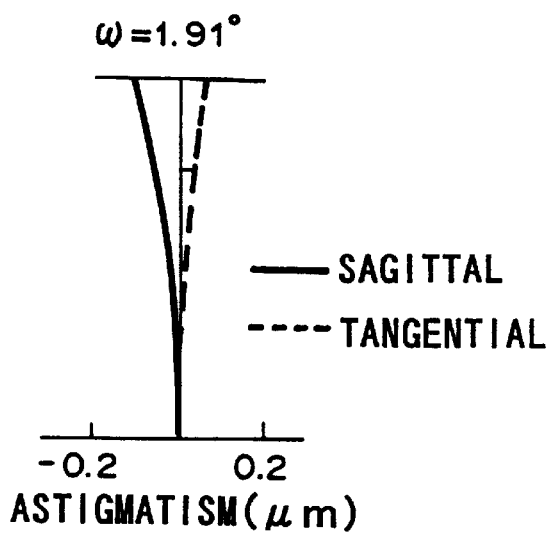
Figures 1, 8C:
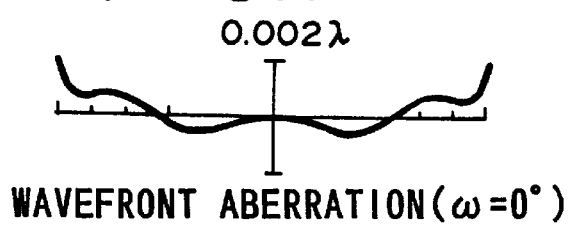
Figures 2, 8C:
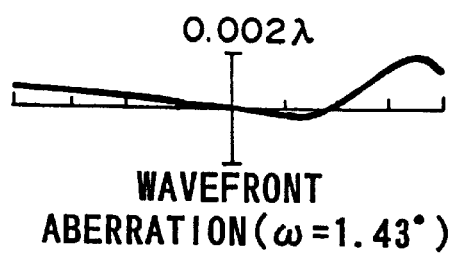
Figures 3, 8C:
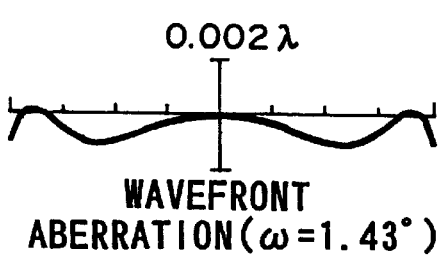
Figures 4, 8C:
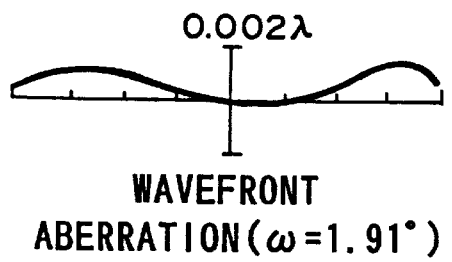
Figures 5, 8C:
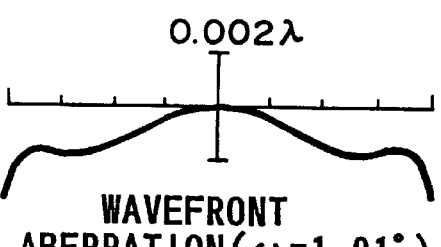

As can be seen from FIGS. 4 A to 8C-5, all kinds of aberration can be made favorable in accordance with each of the above-mentioned Examples.

Without being restricted to those of the above-mentioned Examples, the collimator lens of the present invention can be modified in various manners. For example, values of radius of curvature R of each lens and lens space (or lens thickness) D can be changed as appropriate.

In the collimator lens in accordance with the present invention, a first lens having a negative refracting power and a second lens having a positive refracting power are disposed successively from the parallel luminous flux side, whereas at least one surface of the second lens is formed as an aspheric surface. As a consequence, in the collimator lens in accordance with the present invention and the light-scanning apparatus using the same, though in a simple lens configuration of two groups and two elements, off-axis performances can favorably be corrected to about 2 degrees in terms of half angle of view, while a certain degree of numerical aperture (approximately NA=0.25 to 0.3) is secured, and necessary back focus can be ensured.

TABLE 1

Example 1

| Surface | R | D | N |
|---|---|---|---|
| 1 | −0.4508 | 0.2787 | 1.71222 |
| 2 | −0.6179 | 0.0500 | |
| *3 | 1.2017 | 0.2500 | 1.58252 |
| 4 | −1.3374 | | |
| k | $9.7955 \times 10^{-1}$ | | |
| $a_4$ | $-2.6792 \times 10^{-1}$ | | |
| $a_6$ | $-9.3375 \times 10^{-2}$ | | |
| $a_8$ | $-4.4527 \times 10^{-1}$ | | |
| $a_{10}$ | $2.0907 \times 10^{0}$ | | |
| NA | 0.25 | | |
| ω | 1.91 | | |
| Bf | 1.1612 | | |
| $R_1/f$ | −0.45 | | |

TABLE 2

Example 2

| Surface | R | D | N |
|---|---|---|---|
| 1 | −0.4167 | 0.2500 | 1.71222 |
| 2 | −0.5542 | 0.0333 | |
| *3 | 1.1767 | 0.2500 | 1.58252 |
| 4 | −1.4022 | | |
| k | $9.4609 \times 10^{-1}$ | | |
| $a_4$ | $-2.7043 \times 10^{-1}$ | | |
| $a_6$ | $-2.1754 \times 10^{-2}$ | | |

TABLE 2-continued

Example 2

| Surface | R | D | N |
|---|---|---|---|
| $a_8$ | $-1.3842 \times 10^{0}$ | | |
| $a_{10}$ | $-4.8077 \times 10^{0}$ | | |
| NA | 0.25 | | |
| ω | 1.91 | | |
| Bf | 1.1396 | | |
| $R_1/f$ | −0.42 | | |

TABLE 3

Example 3

| Surface | R | D | N |
|---|---|---|---|
| 1 | −0.5402 | 0.4533 | 1.80331 |
| 2 | −0.7712 | 0.1833 | |
| *3 | 0.9876 | 0.3667 | 1.58252 |
| *4 | −2.8931 | | |

| 3rd surface | | 4th surface | |
|---|---|---|---|
| k | $1.0226 \times 10^{0}$ | k | $1.0021 \times 10^{0}$ |
| $a_4$ | $-7.8702 \times 10^{-2}$ | $a_4$ | $1.5385 \times 10^{-1}$ |
| $a_6$ | $-4.2453 \times 10^{-2}$ | $a_6$ | $-4.7227 \times 10^{-2}$ |
| $a_8$ | $1.3065 \times 10^{-1}$ | $a_8$ | $8.3706 \times 10^{-2}$ |
| $a_{10}$ | $-1.0080 \times 10^{0}$ | $a_{10}$ | $-1.1427 \times 10^{0}$ |
| NA | 0.30 | | |
| ω | 1.91 | | |
| Bf | 0.8427 | | |
| $\phi_4$ | 0.77 | | |
| $r_4$ | −3.3028 | | |
| $R_1/f$ | −0.54 | | |

TABLE 4

Example 4

| Surface | R | D | N |
|---|---|---|---|
| 1 | −0.5192 | 0.4583 | 1.80331 |
| 2 | −0.7394 | 0.1667 | |
| 3 | 0.9021 | 0.3833 | 1.58252 |
| *4 | −5.2027 | | |
| k | $1.0029 \times 10^{0}$ | | |
| $a_4$ | $3.0733 \times 10^{-1}$ | | |
| $a_6$ | $-1.6460 \times 10^{-1}$ | | |
| $a_8$ | $5.1002 \times 10^{-1}$ | | |
| $a_{10}$ | $-6.8613 \times 10^{-1}$ | | |
| NA | 0.30 | | |
| ω | 1.91 | | |
| Bf | 0.8240 | | |
| $\phi_4$ | 0.75 | | |
| $r_4$ | −9.1101 | | |
| $R_1/f$ | −0.52 | | |

TABLE 5

Example 5

| Surface | R | D | N |
|---|---|---|---|
| 1 | −0.7833 | 0.4514 | 1.80331 |
| 2 | −3.3962 | 0.1732 | |
| *3 | 1.0235 | 0.3667 | 1.58252 |
| *4 | −0.8454 | | |

| 3rd surface | | 4th surface | |
|---|---|---|---|
| k | $9.9919 \times 10^{-1}$ | k | $9.5759 \times 10^{-1}$ |
| $a_4$ | $-5.1960 \times 10^{-1}$ | $a_4$ | $2.4684 \times 10^{-1}$ |
| $a_6$ | $-5.1982 \times 10^{-1}$ | $a_6$ | $-4.1108 \times 10^{-1}$ |

TABLE 5-continued

Example 5

| Surface | R | D | N |
|---|---|---|---|
| $a_8$ | $-1.2417 \times 10^0$ | $a_8$ | $-3.7005 \times 10^0$ |
| $a_{10}$ | $-2.9701 \times 10^1$ | $a_{10}$ | $-9.0700 \times 10^0$ |
| NA | 0.25 | | |
| ω | 1.91 | | |
| Bf | 1.0053 | | |
| $\phi_4$ | 0.75 | | |
| $r_4$ | −0.8630 | | |
| $R_1/f$ | −0.78 | | |

What is claimed is:

1. A collimator lens comprising, successively from a parallel luminous flux side, a first lens having a negative refracting power and a second lens having a positive refracting power, wherein at least one surface of said second lens is formed as an aspheric surface, wherein said first lens of the collimator lens is closest to the parallel luminous flux side, and wherein said collimator lens satisfies the following conditional expression (1):

$$-0.87 < R_1/f < -0.38 \tag{1}$$

where $R_1$ is the paraxial radius of curvature of the surface of the first lens on the parallel luminous flux side; and f is the focal length of the whole lens system.

2. A collimator lens according to claim 1, wherein the surface of said second lens on a light source side is formed as a convex surface.

3. A collimator lens according to claim 1, wherein the surface of said first lens on the parallel luminous flux side is formed as a concave surface.

4. A collimator lens comprising, successively from a parallel luminous flux side, a first lens having a negative refracting power and a second lens having a positive refracting power, wherein at least one surface of said second lens is formed as an aspheric surface, and wherein the first lens and the second lens are both rotationally symmetrical.

5. A Collimator lens according to claim 4, wherein the surface of said second lens on a light source side is formed as a convex surface.

6. A collimator lens according to claim 4, wherein the surface of said first lens in the parallel luminous flux side is formed as a concave surface.

7. A collimator lens according to claim 4, wherein said collimator lens satisfies the following conditional expression (1):

$$-0.87 < R_1/f < -0.38 \tag{1}$$

where $R_1$ is the paraxial radius of curvature of the surface of the first lens on the parallel luminous flux side; and f is the focal length of the whole lens system.

* * * * *